F. G. NIND & F. JULYAN.
FOLDING MACHINE.
APPLICATION FILED DEC. 13, 1909.

1,048,996.

Patented Dec. 31, 1912.

6 SHEETS—SHEET 4.

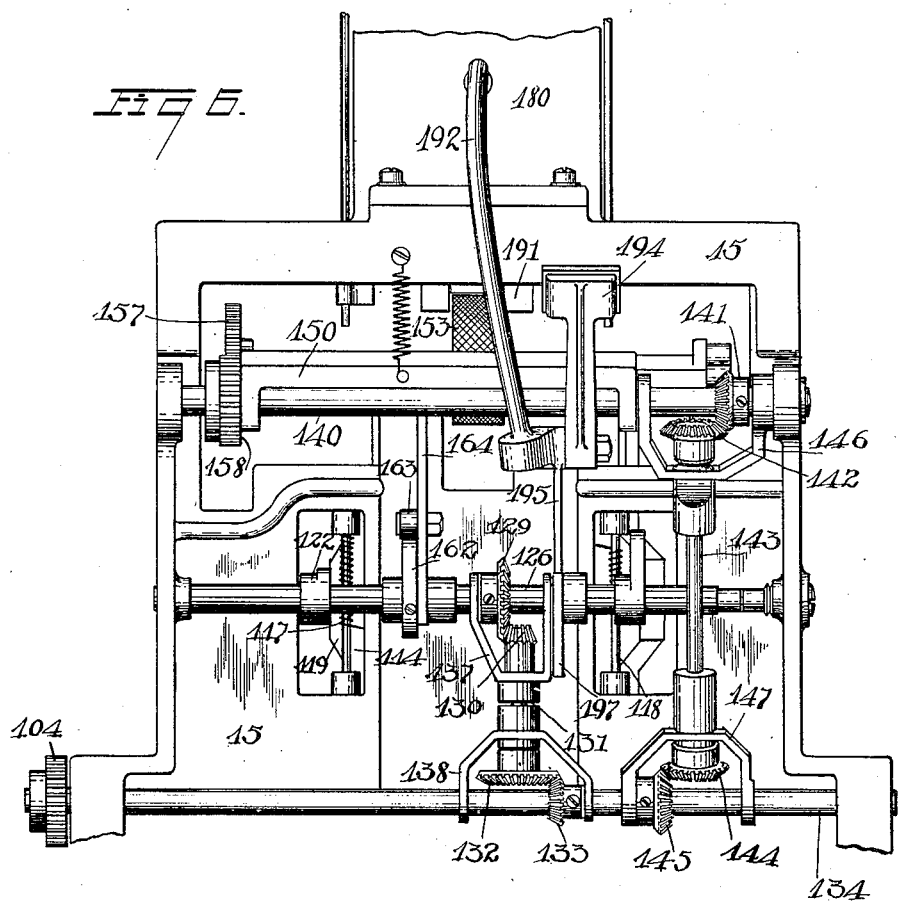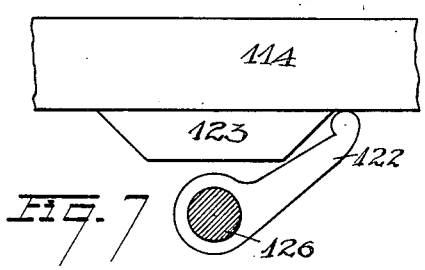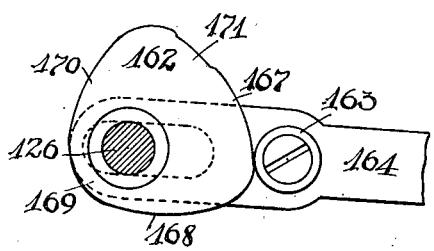

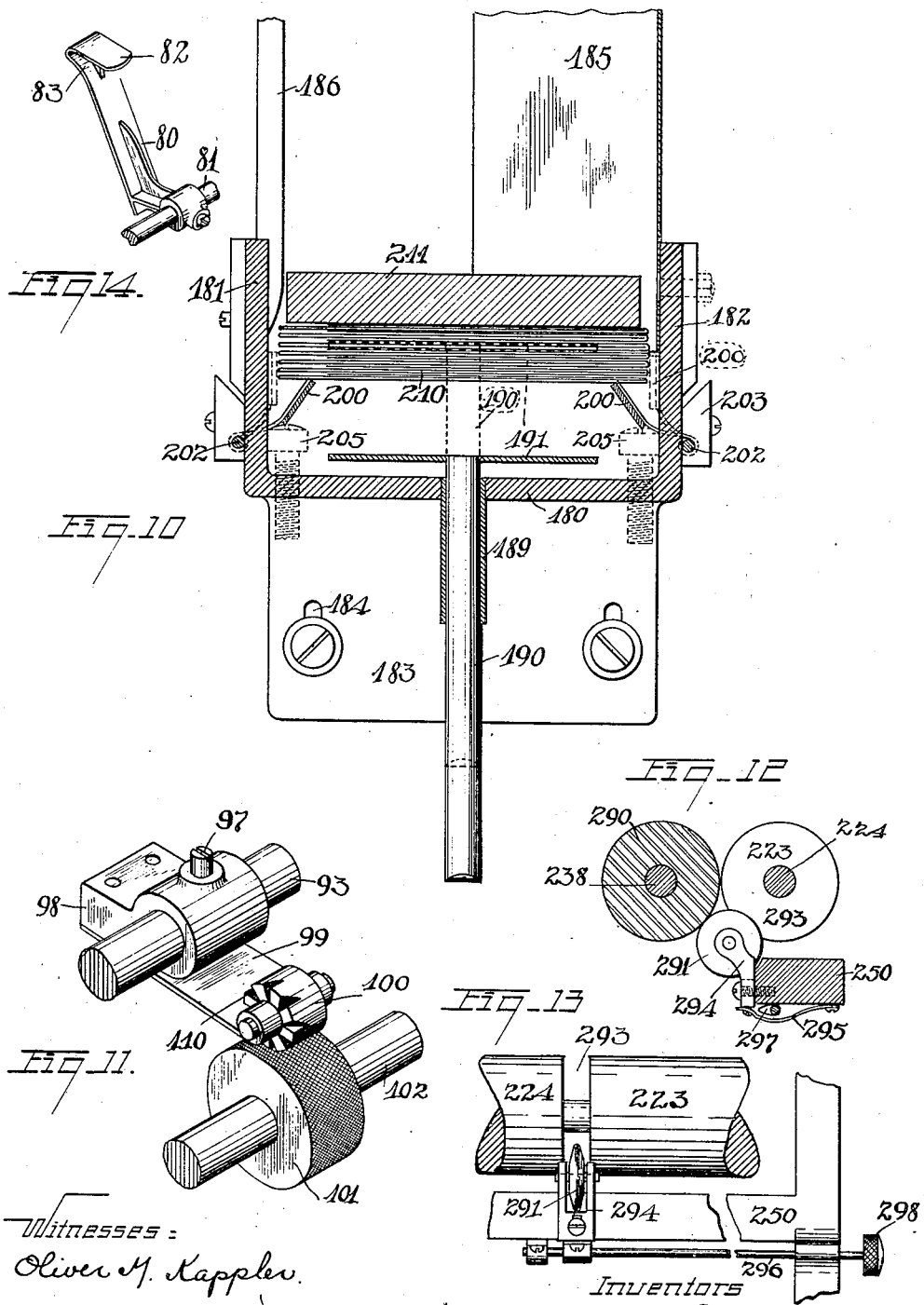

UNITED STATES PATENT OFFICE.

FREDERICK G. NIND AND FREDERICK JULYAN, OF CLEVELAND, OHIO, ASSIGNORS TO THE AMERICAN MULTIGRAPH COMPANY, OF CLEVELAND, OHIO, A CORPORATION OF OHIO.

FOLDING-MACHINE.

1,048,996. Specification of Letters Patent. Patented Dec. 31, 1912.

Application filed December 13, 1909. Serial No. 532,723.

*To all whom it may concern:*

Be it known that we, FREDERICK G. NIND and FREDERICK JULYAN, a subject of the King of Great Britain and a citizen of the United States, respectively, residing at Cleveland, in the county of Cuyahoga and State of Ohio, have invented a certain new and useful Improvement in Folding-Machines, of which the following is a full, clear, and exact description, reference being had to the accompanying drawings.

The object of this invention is to provide a simple and effective mechanism for folding.

More particularly, the invention comprehends the folding of sheets of paper of office size, with a plurality of folds, as, for example, in the case of ordinary letter sheets, one transverse and two longitudinal folds, or two transverse folds, according to whether the product is designed for a small or large envelop.

A further object of the invention is to provide a simple mechanism enabling different folds to be made by an adjustment of the machine instead of by removing and substituting other parts.

The invention, though including the particular means shown herein and hereinafter described, in its broadest aspect is not limited to such means and is adapted for producing other folds than those shown.

The invention may, accordingly, be most conveniently summarized as consisting of the combinations of parts hereinafter more fully described and set out in the claims.

Figure 1:
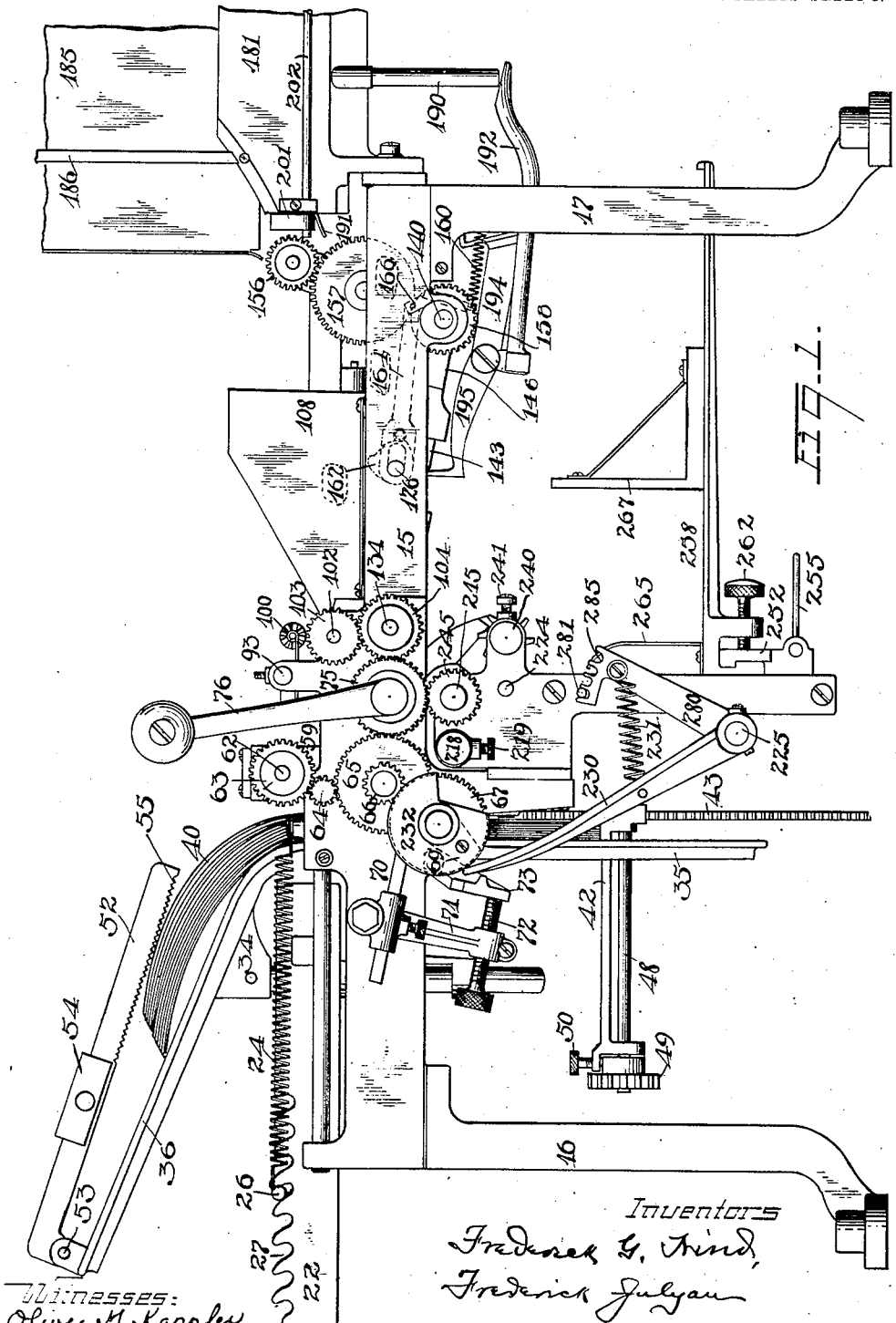
Figure 2:
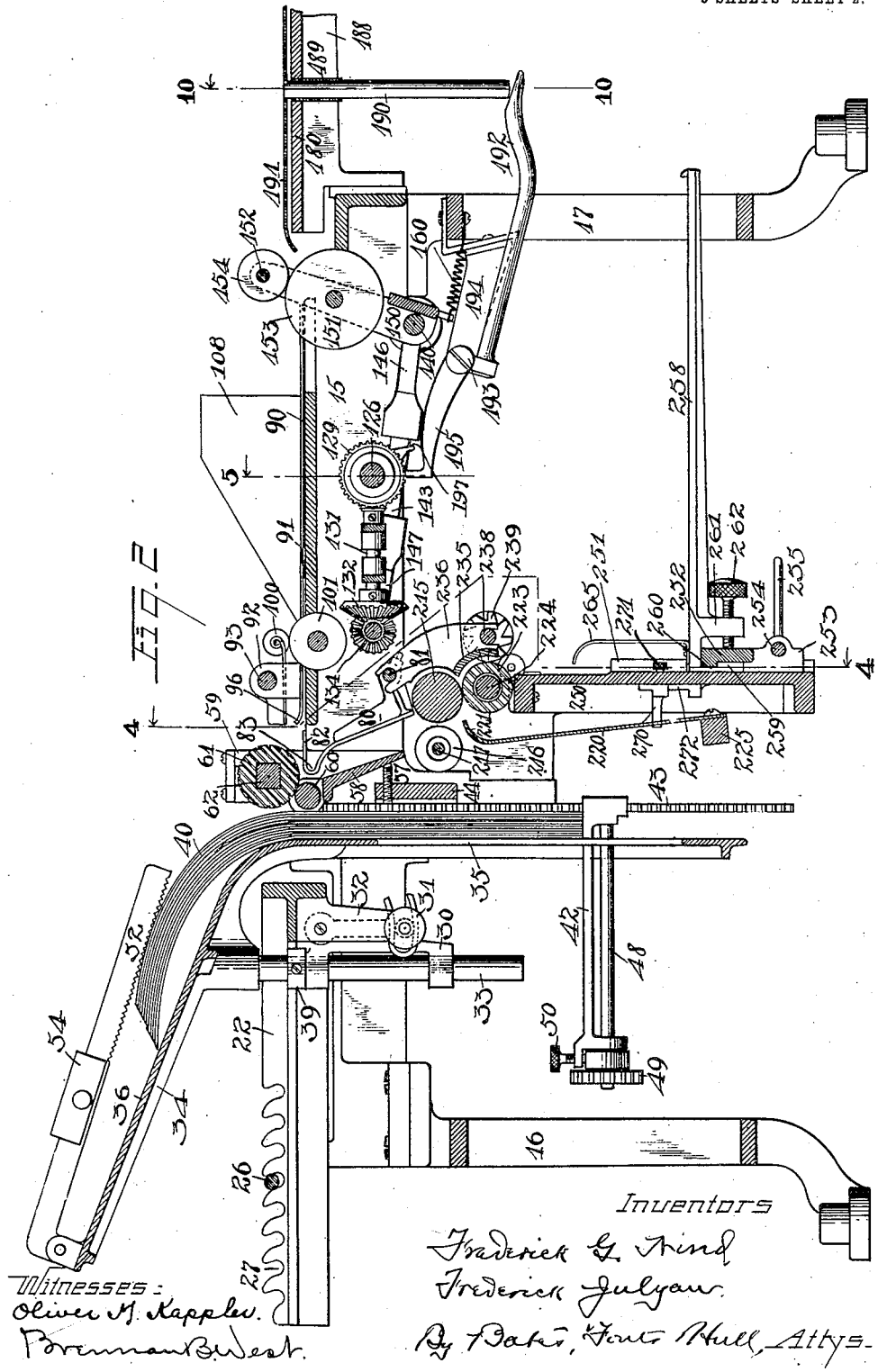
Figure 3:
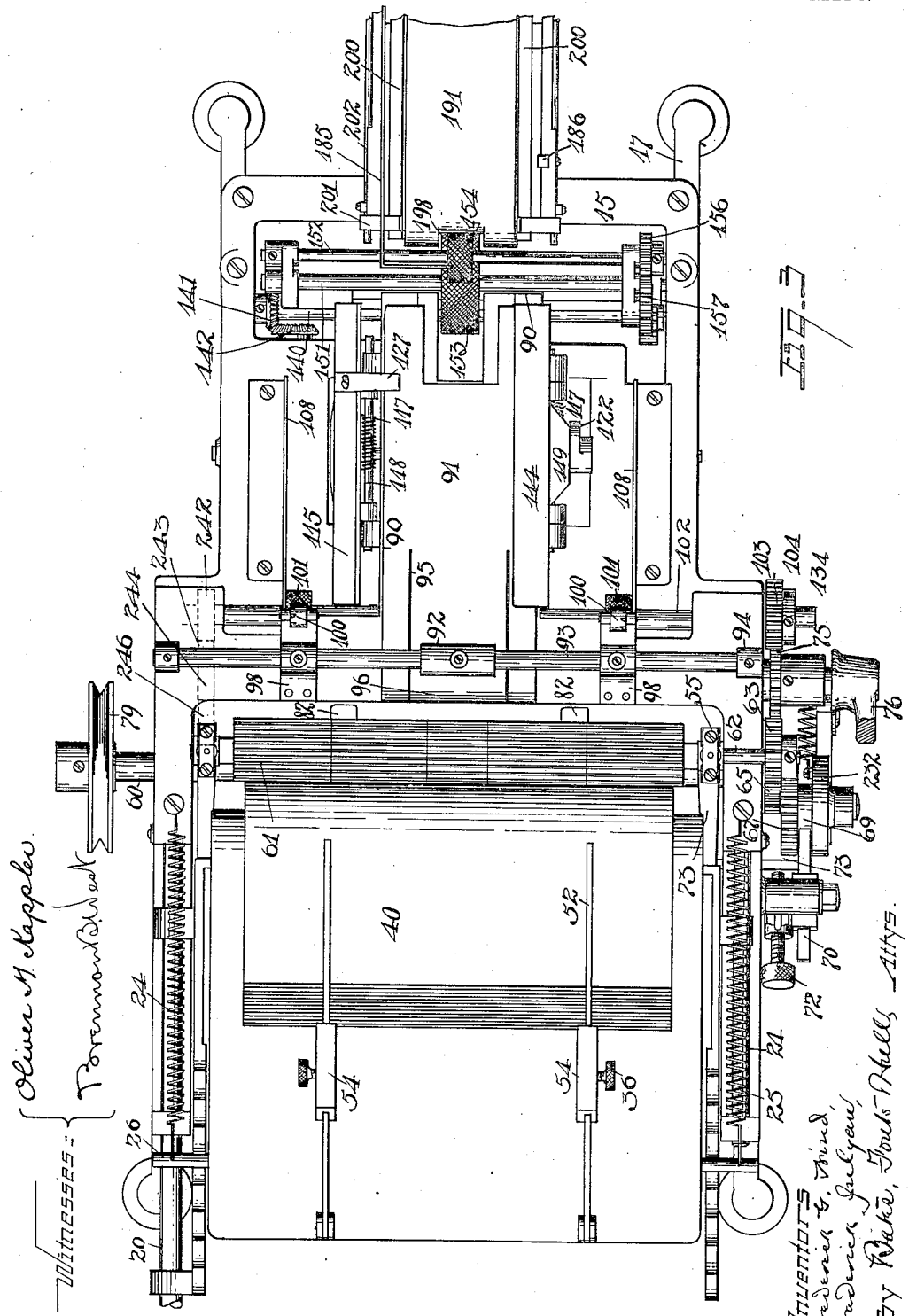
Figure 4:
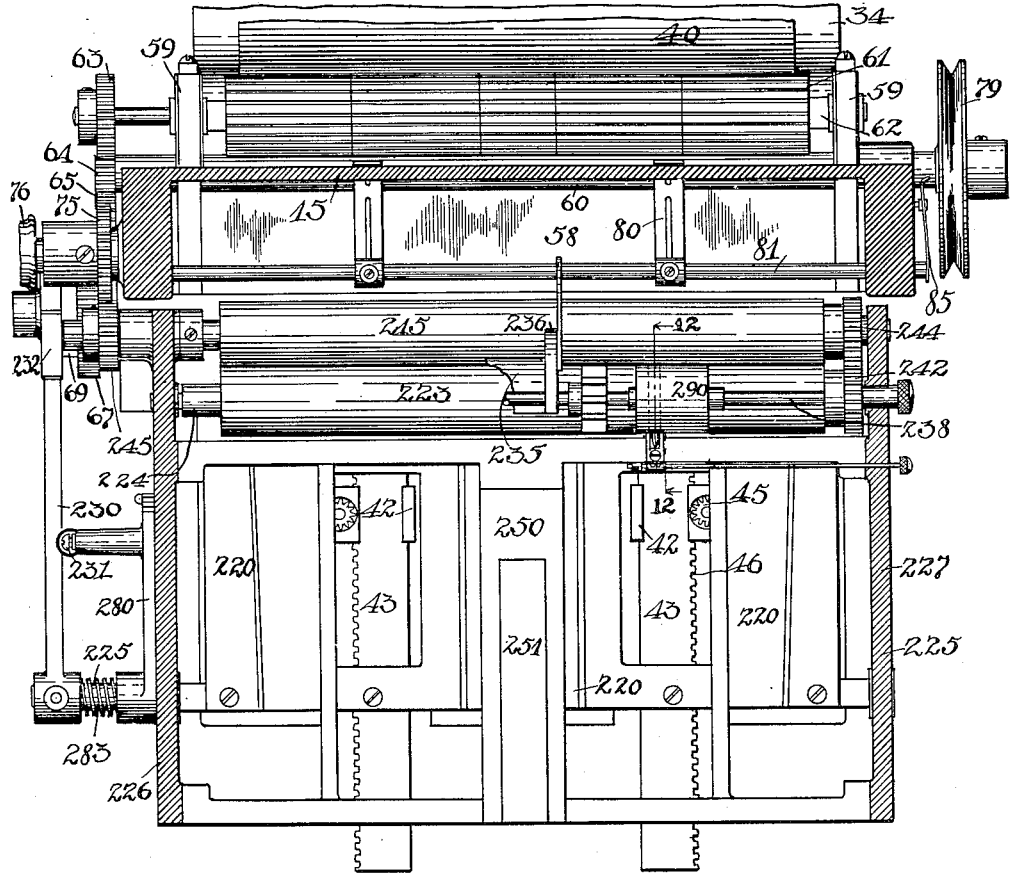
Figure 5:
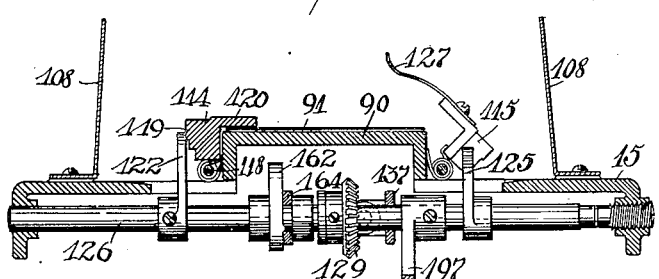

In the drawings—Figure 1 is a front elevation of a paper-folding machine embodying our invention and adapted for giving a sheet a transverse fold and two longitudinal folds or two parallel folds, as desired. In this and other views a portion of the upright stacker is broken away. Fig. 2 is a vertical longitudinal central section of the machine; Fig. 3 is a plan of the machine; Fig. 4 is a vertical section of the machine taken in front of the mechanism for effecting the second transverse fold; that is, substantially on the offset line 4—4 of Fig. 2; Fig. 5 is a vertical transverse section along the axis of the cam shaft, as indicated by the line 5—5 of Fig. 2; Fig. 6 is a bottom plan of the mechanism for giving the two longitudinal folds; that is, mechanism shown in the right-hand half of Figs. 1, 2 and 3; Figs. 7, 8 and 9 are details,—Fig. 7 showing the cam for operating the turning wings; Fig. 8 the cam for the extractor of the folded sheet; Fig. 9 the cam for the upright stacker; Fig. 10 is a vertical central transverse section of the stacker as indicated by the line 10—10 of Fig. 2; Fig. 11 is an enlarged perspective view of paper-advancing rolls which operate to feed the paper into the longitudinal folding mechanism; Fig. 12 is a detail illustrating the creasing roll which is used primarily for creasing transversely folded sheets to enable their convenient insertion in outlook envelops. This view is a vertical section on the line 12—12 of Fig. 4; Fig. 13 is an elevation of the creasing roll and coöperating parts, looking from the same direction as Fig. 4; and Fig. 14 is a perspective of one of the guide fingers for directing the primarily folded product to either of the subsequently acting folding mechanisms.

The support and feeding means for the block of paper and the means for dislodging successive sheets thereof and giving them the first fold, is substantially that shown, described and claimed in our prior Patent #839,313, and our prior application No. 471,138. It will be convenient, however, to describe the same before proceeding to a description of the mechanism which is new in the present application.

The machine shown in the drawings has a skeleton bed 15 and two end standards 16 and 17 also of skeleton form, and in effect providing four legs for the machine. Rigidly held by ears on this skeleton bed are a pair of guide rods 20 and 21, and slidably mounted on these rods is a cross-head 22. This cross-head is given a pressure toward the right of Figs. 1, 2 and 3, by means of springs 24 and 25 which are anchored to the frame and at their rear ends are connected to a rod 26 which occupies any of the notches 27 in the cross-head, the spring pressure being thus adjustable. Pivoted on a transverse axis in the cross-head is a bracket 30 which is held in adjustable position by a set screw 31 clamping said bracket to an ear 32 depending from the cross-head. Swiveled in the bracket 30 is a vertical rod 33 which carries the paper table 34 which is preferably of a plate form, as shown, with a substantially vertical lower portion 35 and an inclined upper portion 36. These portions are connected by a curve merging with them.

The block of paper, shown at 40, in Figs. 1, 2 and 3, stands in front of the portion 35 of the table and rests at its lower edge on two supporting bars 42 which are adjustably held on vertical bars 43 mounted on a cross member 44 of the skeleton frame. These supports yoke around the vertical bars and are held thereon in adjustable position by reason of pinions 45 meshing with teeth 46 in the edges of the vertical bars, each pinion being on the end of a shaft 48 which carries a head 49 by which the shaft may be rotated, such rotation raising or lowering the support. The support is locked in the desired position by set screw 50 clamping the shaft 48.

The upper edge of the paper is held lightly over the inclined portion of the table by suitable bars 52 which are pivoted at 53 to the far end of the table and carry in adjustable position suitable weights 54 and have serrated under-edges 55 to engage the paper.

By the above construction it will be seen that the support for the block of paper is capable of various adjustments to properly present the paper and to allow for variations in the thickness, weight, stiffness and moisture of the paper, etc. The support for the paper is adjustable up and down; the effective weight of the bars 52 is adjustable; the table is adjustable up and down by changing its holding collar 39, and may be tipped backward or forward by the pivoted support shown and it is freely swiveled so it may twist. Accordingly, its adjustment is universal. As before stated, its spring-feeding pressure is also adjustable.

To dislodge the sheets of paper from the block of paper a sheet at a time, and at the same time transversely fold the sheets, we provide a pair of folding rollers 60 and 61, of steel and rubber, respectively, which are rotated coöperatingly, while at the same time roll 61 swings bodily about the axis of the roll 60 toward the paper to engage it and feed the upper portion of the sheet downwardly to bend it into the bite of the two rolls.

To effect the conjoint swinging and rotating operation, we journal the shaft 62 of the upper roll in boxes which are mounted in a frame 59 which is journaled on the shaft of the roll 60. On the ends of the shafts 62 and 60 we mount meshing gears 63 and 64, respectively, whose pitch circles bear the same relation as the periphery of the rolls 61 and 60. Meshing with the pinion 64 is shown a gear 65 which has on it a pinion 66 meshing with a gear 67 which carries a cam 69 (shown in dotted lines in Fig. 1). This cam is adapted to engage the underside of a bar 70 adjustably carried by a swinging arm 71, the bar and arm together accordingly making a bell crank. Screwing through the lower portion of the arm is a screw 72 which abuts against an arm 73 depending from the rocking frame 59 which carries the roller 61. Meshing with the gear 65 is a gear 75 journaled on a frame stud and carrying the driving crank 76. Now, when this crank is given a right-hand rotation the gear 65 rotates in the left-hand direction, and this gives a right-hand rotation to the roller 60 and a left-hand rotation to the roller 61, and while these gears are so rotating, the cam 69, engaging the underside of the bar 70, raises it and rocks the arm 73 of the frame 59 toward the right, which swings the roll 61 (while it is rotating in the left-hand direction), toward the paper to engage the same. Such conjoint rotating and swinging of the roll effectively pinches each successive sheet of paper, doubling it and feeding it between the rolls 60 and 61, thus giving it a transverse fold. A suitable set screw 57 carried by the bar 44 of the main frame, limits the movement of the rocking frame.

While the rolls are rotated and swung as above described by the power of the crank 76, other power may be used, as indicated by the pulley 79 (Fig. 3) on the opposite end of the shaft of the roll 60. The roll 61 may conveniently be made of a series of fluted rubber sections mounted on a squared portion of the shaft 62, and such is the form shown.

The construction so far described is shown and claimed in our prior patent and application referred to, and to which reference may be made for a further description.

In order to give subsequent folds, either transverse or longitudinal, to the once-folded sheets passing to the right of the pinching rolls 60 and 61, we provide a second longitudinal folding mechanism, a transverse folding mechanism, and an adjustably positioned deflector to direct the paper to one or the other, as desired. We will first describe the parts which coöperate to give two longitudinal folds to the transversely folded sheet, whereby the sheet becomes folded after the manner of an ordinary office letter.

Immediately adjacent to the line of discharge of the pinching rolls 60 and 61 are suitable guide fingers of the form shown at 80 in Fig. 2, appearing also in detail in Fig. 14. These fingers are rigidly mounted on a transverse rock-shaft 81 which extends across the frame and is journaled in it. The fingers extend diagonally upward from this rock-shaft toward the roller 61. As they approach this roller they curve toward the roller 60 and then curve backwardly so that when adjacent to the roller 60 their thereby removing the limiting factor on the relative movement between the rods 25 and between them and the arm 22, in the event the ends of the collars 27 adjacent the lugs 29 were square.

At the outer or free end of each rod or arm 25 is an interiorly threaded socket 32 in which is received the adjoining threaded end 26 of the arm or rod 25. This socket 32 carries an open bearing member 33 on one side thereof in a plane substantially at right angles to the arm or rod 25, said member being of a shape and size to conform to the shape and contour of the hopper or compartment bottom 15; here shown as being semi-circular and hence the bearing member 33 is illustrated in the form of a ring. Each rod or arm 25 carries a bearing member 33 and as there are two rods or arms 25 in each unit there are two bearing members 33 in each, one on each side of the operating arm 22 at the extreme horizontal limits of the unit. Mounted on the face of each bearing member toward the operating arm 22 by means of the hinge 34 at or adjoining the socket 32, is a solid gate valve 35 of a somewhat greater size than the bearing member 33 and like the bearing member, conforming to the shape and contour of the bottom 15 of the compartment or hopper.

In the present adaptation of this invention, it will be observed from Fig. 2 of the drawings that the combined length of the rods or arms 25 forming a unit is greater than one-half of the length of the hopper or compartment bottom 15: i. e., the combined length of the rods or arms 25 of a single unit is such that they extend from one end of the hopper or compartment to just beyond the outlet or discharge opening 16 when the operating arm is at each end of its path of swinging movement.

From the foregoing, it is manifest that as the operating arm 22 swings in the hopper or compartment under the impetus of the shaft 19, the entire mechanism, consisting of the rods 25, collars 27, sockets 32, bearing members 33, gate valves 35, etc., carried at the lower end of the arm 22, will reciprocate on the bottom 15 of the hopper or compartment, the arc of the swing of the terminal of the arm 22 being accommodated by the pivotal connection between the collars 27 and said arm. Thus the constant agitation within the hopper H by the arm 22 is supplemented by that of the elements carried by said arm and a constant movement of the hopper contents results which overcomes the tendency thereof to set or adhere to the hopper walls.

As the elements carried by the arm 22 move from one end of the hopper bottom 15 to the other, they create a movement of the hopper contents toward and to the outlet or discharge opening 16. This is accomplished through the instrumentality of the gate valve 35, one of which opens and the other closes, alternately during the reciprocation along the bottom 15 of the hopper. By reference to Fig. 2, it will be seen that as the unit moves away from the end of the hopper, it there occupies, the gate valve 35 at the right will open under pressure thereon of the contents passing through the bearing member 33, or the contact of the valve with the bottom 15, or both; and as a result will do no more than agitate the mass; on the other hand, the valve 35 at the left in Fig. 2 will be closed by the same influences that opened the opposed valve and will carry the contents of the hopper before it to the discharge or outlet opening 16, which is the limit of its movement. The reverse movement by the arm 22 reverses the action of the valves 35, bringing the hopper contents from the opposite end of the hopper to the discharge or outlet opening 16. Hence it is manifest that the elements carried and operated by the arm 22 not only create a movement of the mass within the hoppers toward the outlet or discharge opening 16 alternately from each end of the hopper but also assist in and supplement the general mass agitation and movement within the hopper H.

The shape, size, adjustment and position of the various elements of this invention can be changed, as can also the form and construction of the hopper without departing from the spirit and scope hereof.

What is claimed:—

1. The combination with a hopper, having an outlet or discharge opening, of an oscillatory shaft arranged transversely of said hopper, an operating arm extending into said hopper and attached to said shaft for movement therewith, collars disposed on opposite sides of the lower end of said arm and pivoted thereto, a rod secured to each collar, a socket at the free end of each rod, a bearing member carried by each socket and a gate valve pivoted for co-operation with said bearing member.

2. The combination with a hopper, having an outlet or discharge opening, of an oscillatory shaft arranged transversely of said hopper, an operating arm extending into said hopper and attached to said shaft for movement therewith, a fork at the lower end of said arm, a pair of collars pivoted between the arms of said fork and extending in opposite directions therefrom, a rod carried by each collar, the combined length of said rods being such that they extend from one end of said hopper to beyond said outlet or discharge opening, a socket secured to the free end of each rod, a bearing member carried by each socket, and a gate valve co-operating with each bearing member.

3. The combination with a hopper, having an outlet or discharge opening, of an oscillatory shaft arranged transversely of said hopper, an operating arm extending into said hopper and attached to said shaft for movement therewith, a fork at the lower end of said arm, a pair of collars pivoted between the arms of said fork and extending in opposite directions therefrom, a rod carried by each collar, the combined length of said rods being such that they extend from one end of said hopper to beyond said outlet or discharge opening, a socket secured to the free end of each rod, an open bearing member carried by each socket, and a gate valve pivoted for co-operation with said bearing member.

4. The combination with a hopper, having an outlet or discharge opening, of an oscillatory shaft arranged transversely of said hopper, an operating arm extending into said hopper and attached to said shaft for movement therewith, a fork at the lower end of said arm, a pair of collars pivoted between the arms of said fork and extending in opposite directions therefrom, a rod carried by each collar, the combined length of said rods being such that they extend from one end of said hopper to beyond said outlet or discharge opening, a socket secured to the free end of each rod, an open bearing member carried by each socket, conforming in shape to the contour of the hopper bottom, and a gate valve mounted for co-operation with each of said bearing members.

5. The combination with a hopper, having an outlet or discharge opening, of an oscillatory shaft arranged transversely of said hopper, an operating arm extending into said hopper and attached to said shaft for movement therewith, a fork at the lower end of said arm, a pair of collars pivoted between the arms of said fork and extending in opposite directions therefrom, a rod carried by each collar, the combined length of said rods being such that they extend from one end of said hopper to beyond said outlet or discharge opening, a socket secured to the free end of each rod, an open bearing member carried by each socket, conforming in shape to the contour of the hopper bottom, and a gate valve pivotally mounted to control the opening in said bearing member.

6. The combination with a hopper, having an outlet or discharge opening, of an oscillatory shaft arranged transversely of said hopper, an operating arm extending into said hopper and attached to said shaft for movement therewith, a fork at the lower end of said arm, a pair of collars pivoted between the arms of said fork and extending in opposite directions therefrom, a rod carried by each collar, the combined length of said rods being such that they extend from one end of said hopper to beyond said outlet or discharge opening, a socket secured to the free end of each rod, an open bearing member carried by each socket, conforming in shape to the contour of the hopper bottom, and a gate valve pivotally mounted to control the opening in said bearing member, said gate valve being somewhat larger than said bearing member and conforming in shape to the contour of the hopper bottom.

7. The combination with a hopper, having an outlet or discharge opening, of an oscillatory shaft arranged transversely of said hopper, an operating arm extending into said hopper and attached to said shaft for movement therewith, a fork at the free end of said arm, a collar on each side of said fork, a cut-away lug on each collar, said lugs being pivoted between the arms of said fork, the cut-away portion of one lug receiving the remaining lug, a rod carried by each collar, the combined length of said rods being sufficient to extend from either end of said hopper to beyond the aforesaid discharge or outlet opening, a socket secured to the free end of each rod, a bearing member in the form of a ring depending from said socket, and a gate valve pivoted adjoining the inner face of each bearing member, said gate valve comprising a solid circular plate of a somewhat greater diameter than that of the bearing member.

8. The combination with a container for holding a plastic substance, said container having a continuously open outlet at a fixed location in the container, said outlet being free at all times for the uninterrupted passage of the contents therethrough, of reciprocating, agitating means within said container movable to and fro always beneath the level of the contents and operative both to move the contents alternately from opposite sides of said outlet toward the latter and to prevent the contents adhering to the container, said means in its operation leaving said outlet open at all times.

9. The combination with a depending operating and agitating arm, of oppositely extending rods pivoted at their inner ends to the lower end of said arm, and valves carried at the outer ends of said rods, said valves being arranged to alternately open and close as said rods are reciprocated.

10. The combination with an oscillatory operating and agitating arm, of oppositely extending rods pivoted thereto, and valves at the free ends of said rods adapted to alternately open and close during the movement of said arm.

11. The combination with a container having a bottom and inclined sides, said bottom being provided with a central outlet, and reciprocating means movable over said bottom and operative to draw portions a vertical tubular guide 189. Slidable vertically in this guide is a plunger rod 190 having at its upper end a lifter plate 191, and resting at its lower end on a lever 192. This lever is pivoted intermediately at 193 to the bracket 194 carried by the frame. The forward portion 195 of the lever has an up-turned and diagonally-extending end 196 which coöperates with a cam 197 (Fig. 9) on the shaft 126. While the face 171 of the cam 162 is opposite the roller 163, the cam 197, then substantially in the position shown in Fig. 9, begins to act downwardly on the portion 196 of the lever arm 195, and raises the lifter plate 191 above the axis of the roller 154. The lifter plate is notched at 198 opposite this roller, and the slight withdrawal of the roller, due to the cam face 171, allows the stacker plate to pass the roller.

The continued movement of the cam 197 continues to raise the lifter plate until it has shoved the folded sheet above the pivoted supporting wings 200, Fig. 10, which drop beneath the sheet and hold it, together with the preceding folded sheets. These detent wings 200 are preferably bars extending from one end of the stacker to the other, and having at their ends ears 201 by which they are journaled on rods 202 carried on the outside of the stacker frame plates 181 and 182. The drawings show blocks 203 secured to the outside of the stacker frame for holding these rods.

When the paper is being elevated, the wings 200 are thereby swung up into vertical position along the inner sides of the stacker frame, as shown in dotted lines in Fig. 10. When the folded sheets clear the wings they drop back by gravity into the position shown in full lines in Fig. 10, their movement being arrested by their engagement of adjustable stop screws 205 mounted in the stacker base. In their innermost position, these wings may be cleared by the lifter plate 191, so that when the cam 197 has passed off of the incline 196 of the arm 195, the lifter plate returns by gravity to normal position, leaving the folded sheet on the bottom of the pile in the stacker. Fig. 10 shows a number of such sheets, 210, in the stacker, surmounted by a suitable weight, which may be a block of wood 211, to retain the sheets compacted. This figure also shows in dotted lines the uppermost position of the plunger plate.

We have now completed the description of the mechanism which gives the ordinary letter fold, namely, one transverse and two longitudinal folds. As heretofore stated, when it is desired to give a subsequent transverse fold, instead of the subsequent longitudinal folds, the shaft 81 is rocked to throw the guide fingers 80 forwardly to close the entrance to the longitudinal folding mechanism described, and direct the paper downwardly. When so directed downwardly, the mechanism about to be described receives the transversely folded sheet and gives it a second transverse fold. This second transverse fold may apply to both portions of the folded sheet, as where legal cap paper is being folded at the middle of a fresh sheet and then at the middle of the folded portions; or the second fold may apply simply to one portion of the folded sheet, for example, with a letter sheet folded for a large envelop, where the first fold is substantially one-third the distance from one end, and the second fold parallel therewith is one-third the distance from the other end. The position of the fold the second folder makes is dependent on the position of the supports 42 of the unfolded paper, heretofore described, (which determine the position of the first fold) and also on the position of the stops of the second transverse folder, which latter mechanism is now to be described.

Referring more particularly to Figs. 1, 2 and 4, it will be seen that the chute provided by the plate 58 of the rocking frame 59 and the fingers 80, leads downwardly into the space between a roller 215 and coöperating rollers 216 mounted on a shaft 217 parallel therewith. This shaft is eccentrically mounted in bushings 218 having knurled heads and clamped by set screws 219. The presentation of the rollers 216 to the roller 215 is accordingly adjustable, so that these rollers, while not being against the roller 215, may stand close enough thereto to act frictionally on the paper without gripping it, and continue the downward momentum thereof given by the primary folding rollers. Such downward feed brings the sheet, folded edge lowermost, in front of a tucker blade 220.

The tucker blade 220 has its upper edge curved to the right, as shown at 221, in Fig. 2, so that its edge stands opposite the line of contact of the roller 215, which is preferably a steel roller, with a coöperating rubber roller 223 mounted on a shaft 224. The tucker blade is preferably of thin spring material and is rigidly mounted at its lower end on a rock-shaft 225. This rock-shaft is mounted in downward portions 226 and 227 of the frame. The end of the rock-shaft 225 has an arm 230 which is held by a spring 231 against a cam 232 rigid with the cam 69 and gear 67 heretofore described. This cam 232 comes into action at the proper time to allow the spring 231 to swing the tucker blade to the right to tuck a sheet between folding rollers 215 and 223, whereby a second transverse fold is given to the sheet. As the sheet is passing between the rollers 215 and 223 and receiving its second transverse fold, it engages the curved guide plate 130

235, which is carried rigidly by arms 236 yoking around the shaft 81 and a shaft 238 mounted parallel with and in front of the roller 223. This guide accordingly deflects the folded sheet downwardly, whence it passes down to the stacker for the second transverse fold. In such movement the sheet is forwarded and delivered downwardly by the notched stacker wheels 239 mounted on the shaft 238. The wheels preferably have teeth with radial and inclined faces, as shown in Fig. 2, the radial face acting downwardly on the upper edge of the folded sheet, to insure its delivery.

The stacker wheel shaft 238 is eccentrically mounted in bushings 240, adjustably held by screws 241. The shaft is shown as rotated by gear 242 meshing with a gear 243 (Fig. 3, dotted lines) on the end of the shaft 224 of the roller 223. This gear 243 meshes with a gear 244 above it, on the shaft of the roller 215. This latter shaft has on its front end a gear 245 meshing with the gear 75 on the crank. Accordingly, the rollers described are rotated in unison with the other rollers.

The stacker for the sheets having a double transverse fold is carried by a skeleton cross frame 250, mounted between the downward frame members 226 and 227. This skeleton cross frame has a vertical dovetailed guide 251 (Figs. 2 and 4) on which slides a cross bar 252, the cross bar being locked to the guide by having a split bearing 253 which may be clamped by a screw 254 operated by a handle 255. Adjustably mounted on the cross bar 252 are horizontal supports 258. These have down-turned inner ends 259 which are notched to engage beneath a rib 260 on the cross bar. The supporting bars also have downwardly extending lugs 261 in which are mounted set screws 262 adapted to engage the forward face of the bar. These supporting bars may therefore be easily adjusted in and out, as desired, and may be clamped in position on the cross bar.

On the upper sides of the supporting bars 258 are spring-like fingers 265 which furnish a rear stop for the downwardly-fed folded sheets. Resting slidably and lightly on the supports 258 is a suitable front stop 267, Fig. 1. As the folded sheets are fed downwardly they engage the curved upper ends of the strips 265 and pass downwardly behind the series of folded sheets and force them, with the front stop 267, forwardly, the stacker wheels engaging the upper edge of the sheet being delivered insuring such action.

Stops limiting the downward movement of the paper before the second transverse fold is given, may be conveniently carried by the supporting bars 258. Such stops are shown in Fig. 2, and designated 270. They are adjustably clamped by set screws 271 on upward extensions 272 of the bars 258. These stops project into open spaces in the tucker blade and thus stand beneath the lower edge of the paper about to be folded. The up-and-down adjustment of the stacker is according to the distance across the finally folded sheet, so that the stacker rollers 239 will be effective in advancing a folded sheet. This same adjustment, therefore, will bring the stops 270 into approximately the proper position, and they may be individually adjusted to accurate position by moving them up or down on the studs 272.

The simple throwing of the guide fingers 82 throws out the longitudinal folder and throws in the second transverse folder, or vice versa. In either case the machine may be operated without other change, the folder not in use performing its operations idly. However, to save the noise which results from the swinging of the tucker blade against the roller 215, when there is no intervening paper, we provide a throw-out mechanism, whereby the tucker blade is rendered idle when its operation is not desired. We accomplish this throw-out by anchoring the spring 231 to a movable arm 280 which is slidably mounted on the shaft 225 and is held in position by having the notch thereon embrace the pin 281 on the frame. A helical spring 283, Fig. 4 surrounding the shaft 225, normally keeps the arm 280 against the frame member 236. The spring, however, allows the arm 280 to be drawn outwardly to free it from the pin 281 so that it may be swung into position toward the left, Fig. 1, where the arm 230 will always clear the cam 232. By the same means the force of the spring 231 may be adjusted, there being a number of notches 285, on the arm 280, any one of which may engage the pin 281.

If desired to throw out more mechanism to save driving power, (though very little power is required to drive the machine) the second transverse folding rollers may be rendered inactive by loosening the gear 245 and sliding it on its shaft out of mesh with the gear 75. Similarly, the longitudinal folder may be thrown out of action by sliding the gear 104 lengthwise of the shaft 134 so as to be out of mesh with the gear 75.

In folding letters adapted to be inserted in outlook envelops, where the address may be seen through an opening or transparent portion of the envelop, it is desirable to give them two transverse folds and one longitudinal crease a suitable distance from the end. This longitudinal crease takes the place of a longitudinal fold, for the small part of the sheet beyond the crease projects at an angle to the rest of the sheet when the letters are removed from the stacker, and as the attendant picks up the sheet to be inserted in the envelop, he simply grasps with one hand the large and small leaves thereof and brings them together with his thumb and fingers. Such action does not materially retard the speed of placing the letters in the envelops. To cause such a longitudinal crease on a sheet already having two transverse folds, we provide a very simple creasing mechanism, shown in Figs. 2, 4, 12 and 13. This creasing mechanism consists of a short additional soft rubber roller 290 mounted on the shaft 238 of the stacker rolls, and a coöperating metal creasing roller 291 having a blunt enough edge to crease the paper without cutting it. This creasing roller occupies a peripheral notch 293 in the roller 223, caused by making a rubber portion of that roller in two separated sections.

The creasing roller is held in a suitable bifurcated bracket 294 slidably mounted on a bar of the transverse frame 250. This roller may be pressed against the roller 290 by a leaf spring 295 carried by the bar 250. To throw the creasing mechanism out of action, when desired, we provide a rock-shaft 296 mounted in the frame and having an arm 297 adapted to engage and depress the spring 295. A knurled head 298 on this rod furnishes means for giving it this operation.

Summarizing the operation of the complete machine, it may be stated that the table 34, with the cross head on which it is mounted, is first shoved to the left,—Figs. 1 and 2,—and the block of paper dropped into place on the supports 42. The table is then allowed to return with its lower portion against the block of paper by the pressure of the springs 24, the rod 26 being put into the proper notches 27 to give the right pressure. The stops 42 are adjusted up or down, if necessary, by the knobs 49 until the paper stands with the line desired to be folded opposite the line of contact of the rollers 60 and 61. The swing of the table is adjusted, if necessary, by the set screw 31 to keep its downward portion parallel with the bars 43 which form the front stops for the paper, or to slightly clamp the paper near the bottom of the block, or free it at the bottom, if there are peculiarities in the paper which render such bending or freeing desirable. The weights 54 if necessary, are adjusted on the bars 52, being slid toward the free end of the bar for increased stiffness of paper to hold the block properly bent over the table.

If the machine is to give two transverse folds, the cross bar 259 is adjusted so that the top of the bars 258 is a distance below the stacker rollers 239, slightly less than the distance across the folded sheet measured transversely of the folds. If necessary, the stops 270 are individually adjusted to bring the second transverse fold into the right position.

It is to be understood that the easiest way to attain the adjustments mentioned is to set the parts approximately, by using a hand folded sheet as a guide, and then put paper in the machine and try a sheet and adjust the parts accordingly.

In the embodiment shown, the mechanism for giving the two longitudinal folds operates in conjunction with a former plate of fixed size, as experience has shown that ordinary letter sheets do not differ in size by wide enough variation to make it necessary to differently position the longitudinal folds for different sheets. It is a very simple matter, however, to remove the former plate 91, as shown in the drawings, and substitute a plate of somewhat different width, if desired. After the proper adjustments are made, it is simply necessary to supply the paper periodically in blocks to the machine and continuously operate the machine by a suitable driving power, hand or otherwise. The picker roll swings forward, and, with the coöperating roll, picks off the front sheet of paper in the block and forces it between the rolls and sends it on folded. Such folded sheet with the folded edge forward passes either horizontally over the tops of the fingers 80 or downwardly on the front sides of those fingers, according to how the fingers are set by the arm 85.

If the fingers are set in the position shown in the drawings, the sheet passes horizontally between the advancing rolls 100 and 101 and beneath the former plate 91 and above the raised bed portion 90. As it comes into this position the stationary wings 108 bend the overhanging portions of the sheet upwardly so that it has an approximately trough-like form, the notches of the roller 100 advancing the sheet until it has entirely cleared the advancing rollers. Now, the folding wing 114 comes into action and folds over the projecting portion of the sheet, and as it is completing its operation the folding wing 115 folds over the rear portion, and as that wing is completing its operation the rocking frame 150 swings so that the rollers 153 and 154 come onto the paper and grasp it between them. The continued rotation of the rollers in this position feeds the paper between them into the stacker above the plate 191, then the outward swinging of the rocking frame causes the roller 154 to complete the shoving of the folded sheet into the stacker, and thereupon the lifter plate rises and elevates the whole block of folded sheets until the lowermost sheet has cleared the detent wings 200. When the paper has been so raised, the detent wings drop back into place and support the block of folded sheets.

It will be understood that the mechanism may be so timed that the sheets follow each other in close succession, and while the drawing-off rollers are engaging and forwarding a folded sheet to the stacker, the dislodging rollers may be giving the first fold to a subsequent sheet, the stacking of the first sheet taking place while such subsequent sheet is receiving its longitudinal folding.

When the second fold is to be transverse, the shaft 81 is rocked so that the guide fingers stand in the path of the folded sheet, and accordingly the sheet passes downwardly assisted by the frictionally acting rolls 216, until the folded edge rests on the stops 270. Then the cam 232 clears the arm 230, and the spring 231 causes the tucker blade to tuck the sheet into the bite of the rollers 215 and 223, whereby it receives the second transverse fold and passes down approximately vertically in front of the fingers 265 and is fed slightly forward against the previously folded sheets by the stacker rollers 239. During this operation the twice-folded sheet may be longitudinally creased, as desired, according to the position of the creasing roller 291, as determined by the rock-shaft 296 and its knob 298.

The completely folded sheets, with the ordinary letter fold, stand one above the other in the vertical stacker and may be lifted out vertically *en masse*, whenever desired. The sheets having two transverse folds stand on edge on the bars 258 and may likewise be grasped as a whole and removed whenever desired. In each case there is sufficient space to allow for the accumulation of a large number of letters. The labor of the attendant, after adjusting the machine, is simply to periodically supply a fresh block of paper and periodically remove the completely folded sheets; and, where the machine is not power-driven, to continuously rotate the crank in the right-hand direction between such operations of placing and removing the paper.

It will be seen from the foregoing description that the folder provided is compact and simple; that there is little about it liable to get out of order, while adjustments are complete for taking care of paper of various weights, thicknesses, and conditions; and, furthermore, that without removing or installing different attachments, the fold may be changed from an ordinary letter sheet with one transverse and two longitudinal folds, to two transverse folds, for either the large-envelop fold of a letter sheet, or the two folds of a half sheet from a block thereof standing on end, or a legal cap fold; and, finally, the double transverse folded sheet may, if desired, be automatically creased to facilitate its insertion in a sight envelop. The machine is accordingly adapted to produce all of the folds required with ordinary office sheets, correspondence, tabulations, circular letters, etc.

Having thus described our invention, what we claim is:

1. In a machine of the character described, the combination, with a former plate, of two pairs of advancing rollers located respectively beyond the opposite edges of said plate, each pair of said rollers having about its periphery and extending part way across its tread a series of notches adapted to engage the rear end of the sheet and carry it clear of the grip of the two rollers.

2. In a folding machine, the combination, with folding mechanism, of two pairs of coöperating advancing rollers spaced apart and in alinement, one roller of each pair having a portion of its periphery smooth, and there being a series of inclined notches in the circular edge where the periphery of said roller meets the outer end thereof.

3. The combination of a pair of folding rollers, a tucker blade coöperating therewith, an adjustably mounted support for receiving the folded product, and a stop for the sheets to be folded, said stop being adjustably carried on said adjustable support.

4. The combination with a pair of folding rollers, a tucker blade, a rock-shaft on which the tucker blade is mounted, a rock arm on the said shaft, another arm, a spring connecting said two arms, and means for holding said other arm in a plurality of adjusted positions.

5. The combination, with a stationary inside former, of a pair of movable wings having two portions at an angle to each other, and means for swinging such wings one after the other inwardly to bring their angles adjacent to the edges of the former to press the projecting portions of a sheet of paper onto the inside former with parallel folds.

6. The combination with an inside former, of a pair of wings hinged alongside thereof and having two portions substantially at right angles to each other, and springs and cams, one tending to swing said wings toward the former and the other away from the former.

7. The combination with an outside and an inside former, said inside former being a thin plate having parallel edges, rollers for advancing a sheet of paper between said formers with portions projecting from each side of the inside former, a pair of stationary guides adapted to give such sheet a preliminary bend, and a pair of wings hinged alongside of the outside former and acting one after the other on the inside former adjacent to its edge to bend the projecting portions of the sheet thereonto.

8. The combination, with an inside former plate, of means for giving a transverse fold to the sheet and for advancing a sheet to the former plate with portions projecting at the edges thereof, a pair of folding members, means for moving them to bend the projecting portions of a sheet onto said former plate, means adapted to hold down the final fold of the sheet, and drawing-off mechanism adapted to engage such completely folded sheet while it is so held.

9. The combination, with folding mechanism including a former plate and means for advancing a sheet of paper along the same with two projecting portions and folding the projecting portions onto each other, of a drawing-off mechanism comprising a movable frame and a pair of rotatable rollers mounted therein, and means for moving said frame to bring the rolls in advance of the rear end of the former plate, whereby said rolls are adapted to engage the folded sheet while it is around the former plate, there being means for moving said frame away from the former plate and simultaneously rotating the rollers in the direction to advance the sheet away from the former plate.

10. The combination, with a former plate with a notch in its rear end, means for advancing a sheet of paper along the plate toward the notch with two projecting portions, means for folding said portions onto the former plate to make a three panel fold with the two extreme panels lapped one onto the other, an oscillating frame, a pair of folding rolls carried thereby, means for holding said frame with the rolls adjacent to the exit end of the former plate and with one of the rolls occupying the notch, means for rotating said rolls in the direction to pinch between them the three panels of the folded sheet, and means for swinging said frame on its axis away from the former plate while said rolls are operating to advance the sheet.

11. The combination with means for folding a sheet of paper, comprising a former plate and a pair of pivoted wings on opposite sides thereof, of a drawing-off mechanism for the folded sheet comprising a rocking frame, a pair of rolls carried thereby, gearing for rotating said rolls, mechanism for swinging said frame toward the folded sheet to engage the same while it is around the former plate and before the wings have released it and for continuing the rotation after such engagement to feed the folded sheet between the rolls, and means for rocking said frame in the opposite direction while the folded sheet is being rolled through it.

12. The combination with an inside former plate, of means for bending the projecting portions of a sheet of paper onto said former plate, a movable frame, a pair of coöperating rolls carried thereby, means for moving said frame to bring the rolls into position to engage the forward edge of a sheet folded around the former plate, means for rotating the rolls to feed such sheet between them, a stacker adapted to receive the folded sheet, and means for moving said frame in the opposite direction to deliver such folded sheet to the stacker.

13. The combination with a former plate and means for folding a sheet of paper about the same, of a stacker comprising suitable guides, a lifter and detent mechanism, and a movable drawing-off mechanism between the former plate and stacker adapted to engage the folded product and deliver it on top of the lifter, and means for thereafter moving the lifter to raise the sheet above the detent mechanism.

14. The combination with folding mechanism, of an upright stacker having a base plate and side guides, a lifter plate, a plunger for operating the same working through the base plate, and a pair of hinged detent wings adapted to be swung outwardly by a rising sheet on the lifter plate and dropped by gravity beneath such sheet when elevated.

In testimony whereof, we hereunto affix our signatures in the presence of two witnesses.

FREDERICK G. NIND.
FREDERICK JULYAN.

Witnesses:
ALBERT H. BATES,
WM. DUNLAP.